United States Patent
Rietman et al.

(10) Patent No.: US 11,368,282 B2
(45) Date of Patent: Jun. 21, 2022

(54) CRYPTOGRAPHIC DEVICE AND METHOD

(71) Applicant: KONINKLIJKE PHILIPS N.V., Eindhoven (NL)

(72) Inventors: Ronald Rietman, Eindhoven (NL); Sebastiaan Jacobus Antonius De Hoogh, Oosterhout (NL); Ludovicus Marinus Gerardus Maria Tolhuizen, Waalre (NL)

(73) Assignee: Koninklijke Philips N.V., Eindhoven (NL)

( * ) Notice: Subject to any disclaimer, the term of this patent is extended or adjusted under 35 U.S.C. 154(b) by 226 days.

(21) Appl. No.: 16/615,603

(22) PCT Filed: May 22, 2018

(86) PCT No.: PCT/EP2018/063414
§ 371 (c)(1),
(2) Date: Nov. 21, 2019

(87) PCT Pub. No.: WO2018/215487
PCT Pub. Date: Nov. 29, 2018

(65) Prior Publication Data
US 2020/0177371 A1    Jun. 4, 2020

(30) Foreign Application Priority Data
May 24, 2017  (EP) ..................... 17172743

(51) Int. Cl.
*G06F 21/00*    (2013.01)
*H04L 9/06*     (2006.01)
*G06F 17/14*    (2006.01)
*H04L 9/00*     (2022.01)

(52) U.S. Cl.
CPC .......... *H04L 9/0631* (2013.01); *G06F 17/141* (2013.01); *H04L 9/002* (2013.01); *H04L 9/0618* (2013.01); *H04L 2209/16* (2013.01)

(58) Field of Classification Search
None
See application file for complete search history.

(56) References Cited

U.S. PATENT DOCUMENTS

| | | | |
|---|---|---|---|
| 6,970,935 B1 * | 11/2005 | Maes | H04L 65/608 709/228 |
| 2014/0223462 A1 * | 8/2014 | Aimone | G06F 3/015 725/10 |
| 2018/0165466 A1 * | 6/2018 | Rad | H04N 19/154 |

FOREIGN PATENT DOCUMENTS

WO    2017063986 A1    4/2017

OTHER PUBLICATIONS

Bianchi, Tiziano et al. Implementing the Discrete Fourier Transform in the Encrypted Domain. 2008 IEEE International Conference on Acoustics, Speech and Signal Processing. https://ieeexplore.ieee.org/stamp/stamp.jsp?tp=&arnumber=4517970 (Year: 2008).*

(Continued)

*Primary Examiner* — Jeremiah L Avery

(57) ABSTRACT

Some embodiments are directed to an electronic cryptographic device arranged to perform a cryptographic operation on input data obtaining output data. The cryptographic device stores an internal state as sets of shares. Fourier coefficients corresponding to the sets of shares satisfy a predetermined relationship among them. The cryptographic operation is performed by repeatedly updating the internal state.

20 Claims, 5 Drawing Sheets

(56) References Cited

OTHER PUBLICATIONS

Fracastoro, Giulia; Magli, Enrico. Steerable Discrete Fourier Transform. IEEE Signal Processing Letters, vol. 24, Issue: 3. https://ieeexplore.ieee.org/stamp/stamp.jsp?tp=&arnumber=7833034 (Year: 2017).*
Chuang, Cheng-Hung; Lin, Guo-Shiang. Adaptive steganography-based optical color image cryptosystems. 2009 IEEE International Symposium on Circuits and Systems. https://ieeexplore.ieee.org/stamp/stamp.jsp?tp=&arnumber=5118094 (Year: 2009).*
Li, Xiaofeng; ZHang, Yinhui. Digital image encryption and decryption algorithm based on wavelet transform and chaos system. 2016 IEEE Advanced Information Management, Communicates, Electronic and Automation Control Conference (IMCEC). https://ieeexplore.ieee.org/stamp/stamp.jsp?tp=&arnumber=7867211 (Year: 2016).*
PCT/EP2018/063414 ISR & WO, Jul. 17, 2918 15 Page Document.
Federal Information Processing Standards Publication 197:' Advanced Encryption Standard (AED), Nov. 2001, 51 Page Document.
Biham et al: Differential Fault Analysis of Secret Key Cryptosystems, Crypto 1997, vol. 1294, pp. 513-525.
Bos et al: "Differential Computation Analysis: Hiding Your White-Box Designs is Not Enough"; IACR2016, pp. 1-22.
Chow et al: "White-Box Cryptography and an AES Implementation"; SAC 2002, LNCS 2595, pp. 250-270, 2003.
Coron et al: "Attack and Improvement of a Secure S-Box Calculation Based on the Fourier Transform"; Ches 2008, LNCS 5154, pp. 1-14.
Gierlichs et al: "Mutual Information Analysis* a Gereric Side-Channel Distinguisher"; CHES 2008, LNCS 5154, pp. 426-442.
Kocher et al: "Differential Power Analysis"; Crypto'99, LNCS 1666, pp. 388-397, 1999.
Oswald et al: "Practical Second-Order DPA Attackes for Masked Smart Card Implenations of Block Ciphers"; From Topics in Cryptology, CT-RSA 2006, David Pointcheval (ED), LNCS 3860, pp. 192-207, 206.
Prouff et al: "Provably Secure S-Box Implementation Based on Fourier Transform"; CHES 2006, CHES 2006, LNCS 4249, pp. 216-230.
Schramm et al: "A Collision-Attack on AES"; CHES 2004: Cryptographic Hardware and Embedded Systems, pp. 163-175.

* cited by examiner

CRYPTOGRAPHIC DEVICE AND METHOD

CROSS-REFERENCE TO PRIOR APPLICATIONS

This application is the U.S. National Phase application under 35 U.S.C. § 371 of International Application No. PCT/EP2018/063414, filed on May 22, 2018, which claims the benefit of European Patent Application No 17172743.1, filed on May 24, 2017. These applications are hereby incorporated by reference herein.

FIELD OF THE INVENTION

The invention relates to a cryptographic device, a cryptographic method and a computer readable medium.

BACKGROUND OF THE INVENTION

A cryptographic primitive is called secure in the black-box model, if an attacker who only has knowledge of the inputs and outputs of the primitive cannot elevate his rights, e.g., obtain secret keys, encrypt messages, decrypt messages, etc. However, in practice attackers often do not operate in the black-box model, and in fact have more information than just the inputs and outputs. For example, in the grey-box model, it is assumed that an attacker has access to some information related to the execution of the primitive. These additional sources of information are called 'side-channels'. For example, side-channels include the amount of time that an operation took, or the amount of power that was consumed, etc. In an even stronger model, the so-called white-box model, and attacker has full access to all internal variables of the primitive. Attackers may also modify variables, even as the program is running. Even so, the white-box implementation aims to prevent the extraction of secret keys from the program.

Implementations that resist white-box attacks, are sometimes implemented as an encoded table network operating on encoded data. In the paper "White-Box Cryptography and an AES Implementation" by S. Chow, et al. a white-box implementation of the block cipher AES (Advanced Encryption Standard) is presented (referred to as 'Chow' below and incorporated by reference herein). Chow forms an implementation of AES that consists entirely of table look-up operations. Through several intermediate methods, the normal cipher is transformed to an implementation in this form, so that a table-network can be used to compute AES. By encoding the tables in the table-network, the system's resistance against analysis and attack is increased. The techniques used in Chow can be applied to other block ciphers as well.

Although a white-box implementation using a table-network is hard to analyze, a table based implementation of block cipher may still be vulnerable to some attacks. Interestingly, attacks developed in the context of the grey-box model can sometimes be effective against white-box implementations as well. Accordingly, avoiding attacks under the grey-box model can be an effective countermeasure in the white-box model too. An example of such attacks can be found in the paper "Differential Computation Analysis: Hiding your White-Box Designs is Not Enough.", by Joppe W. Bos, et al.

There is a need to better protect computer implementations of cryptographic primitives against attacks; in particular, a better protection against grey box type attacks applied to white-box implementations.

Reference is hereby made to the published PCT patent application WO 2017/063986 A1 ("A Cryptographic Device and an Encoding Device").

SUMMARY OF THE INVENTION

An improved cryptographic device is presented which addresses these and other concerns.

The cryptographic device is an electronic device. For example, the device may be a mobile electronic device, e.g., a mobile phone. The electronic device may be a set-top box, smart-card, computer, etc. The cryptographic device and or the cryptographic method described herein may be applied in a wide range of practical applications. Such practical applications include: security, cryptography, content protection, copy protection, financial applications, privacy protection, communication applications, etc.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code stored on a computer readable medium for performing a method according to the invention when said program product is executed on a computer.

In a preferred embodiment, the computer program comprises computer program code adapted to perform all the steps of a method according to the invention when the computer program is run on a computer. Preferably, the computer program is embodied on a computer readable medium.

Another aspect of the invention provides a method of making the computer program available for downloading. This aspect is used when the computer program is uploaded into, e.g., Apple's App Store. Google's Play Store, or Microsoft's Windows Store, and when the computer program is available for downloading from such a store.

BRIEF DESCRIPTION OF THE DRAWINGS

Further details, aspects, and embodiments of the invention will be described, by way of example only, with reference to the drawings. Elements in the figures are illustrated for simplicity and clarity and have not necessarily been drawn to scale. In the Figures, elements which correspond to elements already described may have the same reference numerals. In the drawings.

LIST OF REFERENCE NUMERALS, IN FIG. 1-3

Figure 1:
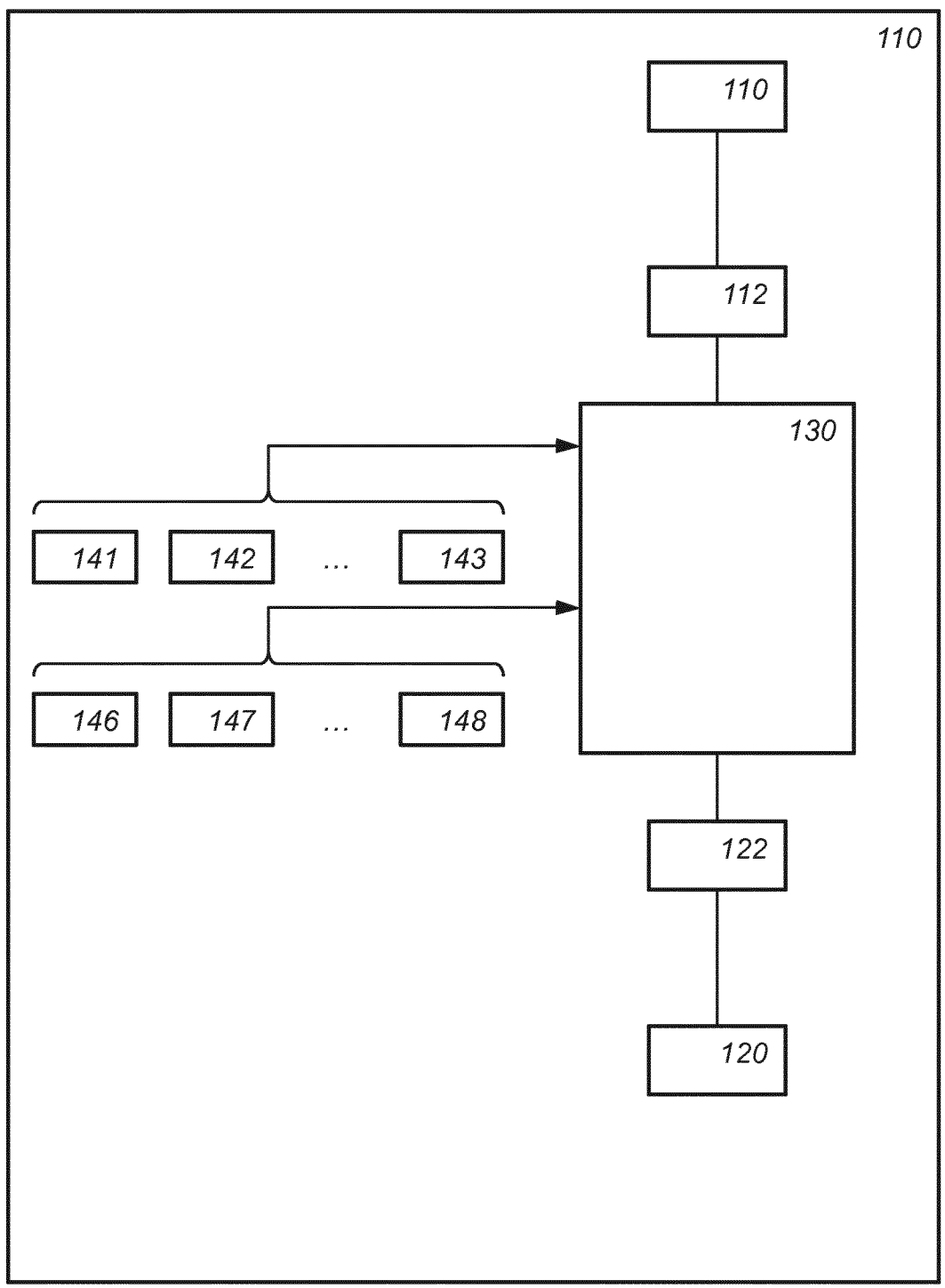
FIG. 1 schematically shows an example of an embodiment of a cryptographic device.

100 a cryptographic device
110 an input interface 112 an input operator
120 an output interface
122 an output operator
130 an internal state storage
141, 142, 143 a non-linear operation
146, 147, 148 a linear operation
210 plain input data
211, 212, 213, 214 an internal state
215 plain output data
310 a plain internal state
311, 312, 313 a data element
320 an internal state represented as a set of shares (unencoded)
321, 322, 323 a set of shares
330 Fourier coefficients for an internal state
331, 332, 333 a set of Fourier coefficients
340 an internal state represented as a set of shares (encoded)
341, 342, 343 a set of encoded shares

DETAILED DESCRIPTION OF PREFERRED EMBODIMENTS

While this invention is susceptible of embodiment in many different forms, there are shown in the drawings and will herein be described in detail one or more specific embodiments, with the understanding that the present disclosure is to be considered as exemplary of the principles of the invention and not intended to limit the invention to the specific embodiments shown and described.

In the following, for the sake of understanding, elements of embodiments are described in operation. However, it will be apparent that the respective elements are arranged to perform the functions being described as performed by them.

Further, the invention is not limited to the embodiments, and the invention lies in each and every novel feature or combination of features described herein or recited in mutually different dependent claims.

Embodiments of the invention allow implementations of cryptographic primitives, such as block cipher, e.g., the AES algorithm that offer a high resilience against a large class of key-recovery attacks, including the white-box generalizations of known side channel attacks, as well as a number of pure white-box attacks. It is noted that implementations according to the invention have increased security not just in the white-box model, but also in the grey box model.

To introduce the invention first a number of attacks on white-box implementations are described. Throughout the document the focus is on the block cipher AES. AES is an important, much-used, cryptographic primitive. However, it is stressed that techniques below can be applied to other cryptographic primitives as well. For example, other block ciphers may be implemented as embodiments. Especially block ciphers of SLT design (Substitution/Linear transformation block ciphers, sometimes referred to as Substitution-permutation network (SPN) block ciphers), such as AES (Rijndael), 3-Way, Kuznyechik, PRESENT, SAFER, SHARK, and Square, can be adapted with little effort. The cryptographic primitive may be a symmetric primitive, e.g., wherein an encrypting/decrypting key is the same, or a signing/verification key. The cryptographic primitive may also be key-less, such as a hash functions. Protecting hash functions may be important, as they may be applied to secret data. In fact, hash functions may be part of a keyed design, such as if the hash function is used in HMAC.

The Advanced Encryption Standard (AES) is described in Advanced Encryption Standard, Federal Information Processing Standards Publication 197, 2001. Below, we outline the major attacks that can be mounted against an implementation of AES, by a 'white-box' attacker who has access to the running program and its environment, and who is able to read and modify all program variables that appear in memory.

Apart from the memory scraping attack, which is a pure white-box attack, the major attacks originate from side channel analysis; these 'grey-box' attacks can also be applied in a white-box environment.

In a Memory scraping attack, the key is read from the program memory. This is the simplest white box attack. To thwart this attack, the key must never appear 'in the clear' in the program memory, but only in some encoded form.

Attacks based on Differential Power Analysis/Differential Computation Analysis/Mutual Information Analysis/Collisions, etc., all work on the principle of collisions. A collision occurs when an internal program variable takes on the same value for two different inputs or outputs of the program. When a collision occurs on a variable that depends not only on the program input or output, but also on the key, then the mere fact that a collision occurs, reveals information on the key. Note that, encoding all AES state and key bytes—e.g., choosing a set E of invertible mappings on the set $\{0,1,K, 255\}$ and replacing each state and key byte x by $E(x)$ for some $E \in E$—does not thwart a collision attack by itself: the encoding E obfuscates the value of byte x, but when a collision occurs on byte x, then it also occurs on the program variable $E(x)$.

In attacks based on Differential Fault Analysis, the attacker runs the program twice on the same input, introduces a fault by changing one or more program variables in one of the runs, and records both outputs. The way in which the two outputs differ may reveal information about the key.

A countermeasure to defend against the latter type of attacks is the masking of variables by using multiple shares to represent them. For example, a variable x can be additively represented by n shares $x_0, K, x_{n-1}$, where $n \geq 2$ and $x_0 \oplus x_1 \oplus \wedge \oplus x_{n-1} = x$. Here addition is the XOR operation. For example, in a hardware implementations, one may choose n−1 of the shares randomly and calculate the remaining one such that the n shares represent the variable x. Then a simultaneous collision on any set of k shares, where k<n, does not reveal any information about whether a collision occurs on variable x; only if a simultaneous collision occurs on all n shares, the attacker can infer that a collision occurs on x. An n-th order DPA attack is thus needed to extract the key.

In a white-box environment, the shares have to be encoded: if the attacker can simply sum (i.e., calculate the exclusive-OR of) the shares to recover the variable x or an encoding $E(x)$ of x, he can check whether there is a collision on the variable x represented by shares X by summing the shares. To prevent this attack, the values that appear in the program should be encodings $E_i(x_i)$ of the shares, where each share $x_i$ is encoded using a different encoding $E_i \in E$. Then the sum $\oplus_{i=0}^{n-1} E_i(x_i)$ is not related to x. Note that if the counter-measures described herein are applied to increase security only in the grey-box model, and not in the white-box model, separate encryption of each share may not be needed. This in turn may lead to more efficient implementations, e.g., by avoiding table look-up operations which operate on encoded shares.

It was an insight of the inventors that the latter, representing a variable as multiple encoded shares, can still be circumvented by a white-box attacker by introducing faults in two or more shares from the same set X, and checking whether the output of the program changes: if the output does not change, then the two share sets X* and X, with and without the faults, respectively, represent the same byte. In fact, when the shares $(\xi_0, K, \xi_{n-1})$ with $\xi_i = E_i(x_i)$ represent the byte x, there exists a share set $(\xi', 0, 0, K, 0)$ in which the last n−1 shares have encoded value 0 and which represents the same value x. So in order to check whether two share sets X and X* represent the same value, the attacker changes X into $\xi, 0, K, 0$ for $0 \leq \xi < 256$ and checks for which value of $\xi$ the output is unchanged, he then finds $\xi^*$ such that X* and $(\xi^*, 0, K, 0)$ give the same output and he concludes that X and X* represent the same value if and only if $\xi = \xi^*$.

With the above attack added security of using shares is neutralized, and many of the grey-box type attacks, in particular attacks based on finding a collision, can be effectively executed. In an embodiment, this share reduction attack is avoided.

Embodiment makes use of the discrete Fourier transform in the finite field. For example, in case data-elements are bytes the finite field may be $F_{256}$, the finite field with 256 elements. In an embodiment, the data-elements are binary words comprising multiple bits; in this case, a finite field with characteristic 2 is appropriate and size 2 to the power of the number of bits. This is not necessary though. One could construct a block cipher operating on words of, e.g., ternary bits, in which case the finite field may have characteristic 3, etc. Below computing with sets of shares is introduced and it is explained how they relate to the Fourier transform.

Representation of data-elements with shares are ideally suited to linear transforms. A linear transform has the property that $L(x_0 \oplus \wedge \oplus x_{n-1}) = \oplus_{i=0}^{n-1} L(x_i)$, so in order to apply L to variable x, L can be applied to each share individually. Note that the shares are typically encoded, so that the operation $L(x_i)$ and the summation may be performed by a table look-up. Note that when the encodings of the shares are linear, the operator L can be represented on the shares as a matrix operating on the bits in the shares, e.g., on 'number of shares' times 'number of bits per data element' bits. Below more elaborate implementations of linear operators are discussed. For example, the shares may be encoded with linear encodings, e.g., random linear encodings so that the encodings can be integrated in the linear operation.

The above computation which works for linear operators does not work for non-linear operators, in particular substitutions boxes, such as the S-box of AES. The AES Sbox, which is a non-linear transformation. Interestingly, any non-linear operation on a data element may be represented as a polynomial. For example, a non-linear transformation f on bytes is a polynomial on the finite field $F_{256}$.

$$f: x \alpha \sum_{j=0}^{255} f_j \cdot x^j, \text{ with } f_j \in F_{256}.$$

Here the sum ($\Sigma$) is the addition on $F_{256}$, i.e., the exclusive-OR of the bytes, and · stands for the multiplication on $F_{256}$. Non-linear transformations can be applied to shares by means of convolutions. The convolution of two share sets $X = (x_0, K, x_{n-1})$ and $Y = (y_0, K, y_{n-1})$ is defined as $$Z = X * Y, \text{ where } Z = (z_0, K, z_{n-1}) \text{ with } z_i = \bigoplus_{j=0}^{n-1} x_j \cdot y_{i-j \bmod n}.$$

It holds that $z = \oplus_{i=0}^{n-1} z_i = x \cdot y$: the convolution of the shares is a share representation of the product. It follows that function f can be implemented on shares as the function $$X \alpha \sum_{j=0}^{255} F_j * X^j,$$

where $X^j$ is the j-fold convolution of X with itself: $X^0$ is a share representation of 1, $X^1 = X$, $X^2 = X*X$, $X^3 = X*X*X$, etc., and where $F_j$ is a share representation of $f_j$.

The AES Sbox can be written as $S = \oplus_{S(0)} o M$ o I, where $I(x) = x^{254}$ is the inverse on $F_{256}$, M is an additive operator on $F_{256}$ and the operation $\oplus_{S(0)}$ adds $S(0) = 0x63$ to its input on $F_{256}$. The additive operator M can be written as an additive polynomial $$M(x) = \sum_{j=0}^{7} m_j x^{2^j},$$

with $m_0 = 0x05$, $m_1 = 0x09$, $m_2 = 0xf9$, $m_4 = 0x25$, $m_5 = 0x01$, $m_6 = 0xb5$, $m_7 = 0x8f$.

Below we further discuss the discrete Fourier transform when the number of shares divides the number of elements in the finite field minus 1; e.g. in the case of bytes 255. Below we discuss the case for bytes, but for other field the situation is analogous. For an element $x \in F_{256} \backslash \{0\}$, the order of x, denoted ord(x), is defined as the smallest positive number k such that $x^k = 1$. For all x, ord(x) divides 255, the number of elements of $F_{256} \backslash \{0\}$. Let n be a divisor of 255, i.e., $n \in \{1, 3, 5, 15, 17, 51, 85, 255\}$, and let $\Omega$ be an element of order n. The Fourier transform $\hat{X} = (\hat{x}_0, K, \hat{x}_{n-1})$ of $X = (x_0, K, x_{n-1}) \in F_{256}^n$ is defined as $$\hat{x}_k = \sum_{j=0}^{n-1} \Omega^{jk} x_j, \quad 0 \leq k < n.$$

We call the numbers $\hat{x}_0, K, \hat{x}_{n-1}$ the Fourier coefficients of the share set X. The inverse Fourier transform is given by $$x_j = \sum_{j=0}^{n-1} \Omega^{-jk} \hat{x}_k, \quad 0 \leq j < n.$$

Compared to the conventional Fourier transform on $C^n$, the overall factor 1/n is missing since $F_{256}$ has characteristic 2 and n is odd. Note that, even though any permutation of a set of shares represents the same data element, for the purpose of the Fourier transform we regard the set as ordered. Likewise, a set of Fourier transforms is ordered. Note that it is unlikely that a permutation of a set of Fourier coefficients still represents the same data element. If a particular Fourier coefficient in a set of Fourier coefficients needs to be identified we refer to its index, e.g., its subscript.

When the share representation is used, with the convention that the sum of the shares equals the represented data element, there is an interesting connection with the Fourier transform: The value represented by the share set X is equal to the zeroth Fourier coefficient $\hat{x}_0$, so the result above implies that if $Z=X*Y$, then $\hat{z}_0=\hat{x}_0\cdot\hat{y}_0$. In fact, this relation holds for all Fourier coefficients, not just the zeroth:

$$Z=X*Y \Leftrightarrow \hat{z}_k=\hat{x}_k\cdot\hat{y}_k,\ 0\le k<n.$$

This implies that the mapping $$X \alpha \sum_{j=0}^{255} F_j * X^j,$$

effectively maps Fourier coefficient $\hat{x}_k$ onto $$\sum_{j=0}^{255} (\hat{f}_j)_k (\hat{x}_k)^j,$$

where $(\hat{f}_j)_k$ is the k-th Fourier coefficient of the share set $F_j$. In embodiments, this natural mapping between a set of shares representation and the corresponding set of Fourier coefficients is exploited, by using the Fourier coefficient with index 0 to represent the data element and Fourier coefficients with a higher index to protect against attacks. However, this is not at all necessary any one, e.g., any single one or two or more together, of the Fourier coefficients may represent the data element, with the remaining Fourier coefficients used to protect against attacks. For example, in an embodiment the data value is not determined solely by the zeroth Fourier coefficient, but by one or more different Fourier coefficients, or by the zeroth Fourier coefficient together with one or more different Fourier coefficients.

The inventors realized that the share reduction attack is successful if it is possible to change two or more shares from a share set in such a way that both the value that the share set represents, and the program output remain the same. The fact that the output doesn't change is used by the attacker as a signal that the faults that he injected did not change the value represented by the share set. One way to thwart this attack, is a mechanism to change the output, preferably in a manner that is unpredictable to an attacker, whenever a change is made to a set of shares X, even when that change leaves the value represented by the share set (e.g., the value $\hat{x}_0$) the same.

FIG. 1 schematically shows an example of an embodiment of a cryptographic device 100. Device 100 is arranged to perform a cryptographic operation on input data and obtain output data; the output data is the result of applying the cryptographic operation to the input data. In an embodiment, the input data and output data are both plain data. We refer to plain data as data which is not encoded with a secret encoding, e.g., an encoding which is unknown to an attack, e.g., a private encoding, e.g., private to device 100. The cryptographic operation may be an encryption or decryption operation, e.g., symmetric, e.g., a block cipher, e.g., AES, or a signing or verification operation, e.g., symmetric. The latter may be a MAC constructed from a hash function or from a block cipher, e.g., a block cipher running in CBC-Mac mode. Device 100 may be integrated in a device that uses the cryptographic operation for some purpose. For example, device 100 may be arranged to receive encrypted content. Using the cryptographic operation, the content may be decrypted. Because of the nature of a white-box implementation, even if the content is decrypted, obtaining the key with which the content is decrypted is hard. For example, device 100 may be arranged to authenticate financial transaction, e.g., by applying a signature or a MAC to a message. For an attacker, it is hard to extract the key with which the operation was done from the device, e.g., from software running on the device.

The execution of the primitive is implemented in a processor circuit, examples of which are shown below. FIG. 1 shows functional units that may be functional units of the processor circuit. For example, FIG. 1 may be used as a blueprint of a possible functional organization of the processor circuit. The processor circuit is not shown separate from the units in FIG. 1. For example, the functional units shown in FIG. 1 may be wholly or partially be implemented in computer instructions that are stored at device 100 and are executable by a microprocessor of device 100. In hybrid embodiments, functional units are implemented partially in hardware, e.g., as coprocessors, e.g., crypto coprocessors, and partially in software stored and executed on device 100.

Device 100 comprises an internal state storage 130. The internal state storage 130 may be implemented as a memory, e.g., an electronic memory. The internal state storage 130 is arranged to store an internal state. The internal state comprises one or more data elements. Data elements may be binary data elements. For example, the data element may be bytes, nibbles or larger words, e.g., in an embodiment data elements comprises multiple bits, say at least 4 bits, and have at least 16 different possible values. Typically, all data elements have the same size. The internal state is repeatedly updated. For example, in the case of AES the internal state comprises 16 data elements, in this case 16 bytes, for a total of 128 bits. The data elements of an internal state are not directly stored in internal state storage 130, as is further explained herein.

Figure 2:
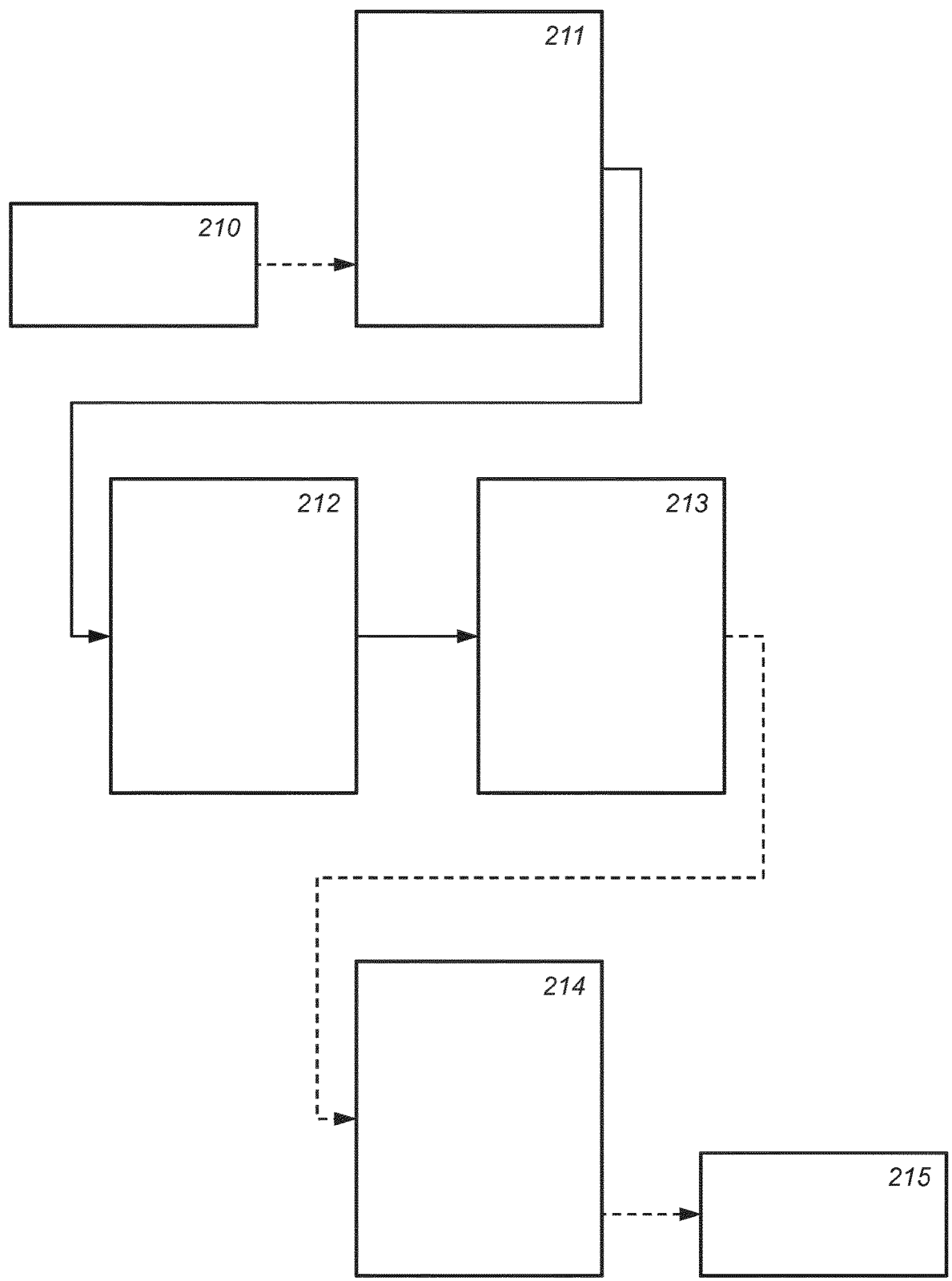
FIG. 2 schematically shows an example of an embodiment of updating an internal state.

This is illustrated in FIG. 2. FIG. 2 schematically shows an example of an embodiment of updating an internal state. Shown in FIG. 2 are internal states 211, 212, 213, 214. By applying linear or non-linear operators the internal states are updated. Shown in FIG. 2 is the update from internal state 211 to internal state 212, from internal state 212 to internal state 213. An initial internal state is derived from the input data. In FIG. 2 the input data is represented at 210, and the initial internal state is internal state 211. Likewise, output data 215 is derived from a final internal state 214. Some of the operations on an internal state may be key dependent. Often the input and output data 210, 215 will be plain, e.g., not encoded with a secret encoding. If device 100 is configured for a block cipher encryption the plain output data is nevertheless an encryption of the input data, e.g., plain encrypted data. This is not necessary though. Device 100 may be integrated in a larger cryptographic system, e.g., a Digital Rights Management (DRM) system. In such a system content can only be rendered if it is allowed by a digital right. The data that enters the cryptographic primitive may be data which is the result of or an input to further cryptographic processing or decision taking. These operations may be performed on encoded data as well. In such a case one or both of the input and output data may be encoded and not plain. It will further be assumed the input and output data is unencoded but an embodiment with encoded input/output data may be produced by leaving out the corresponding transformation steps.

Figure 3:
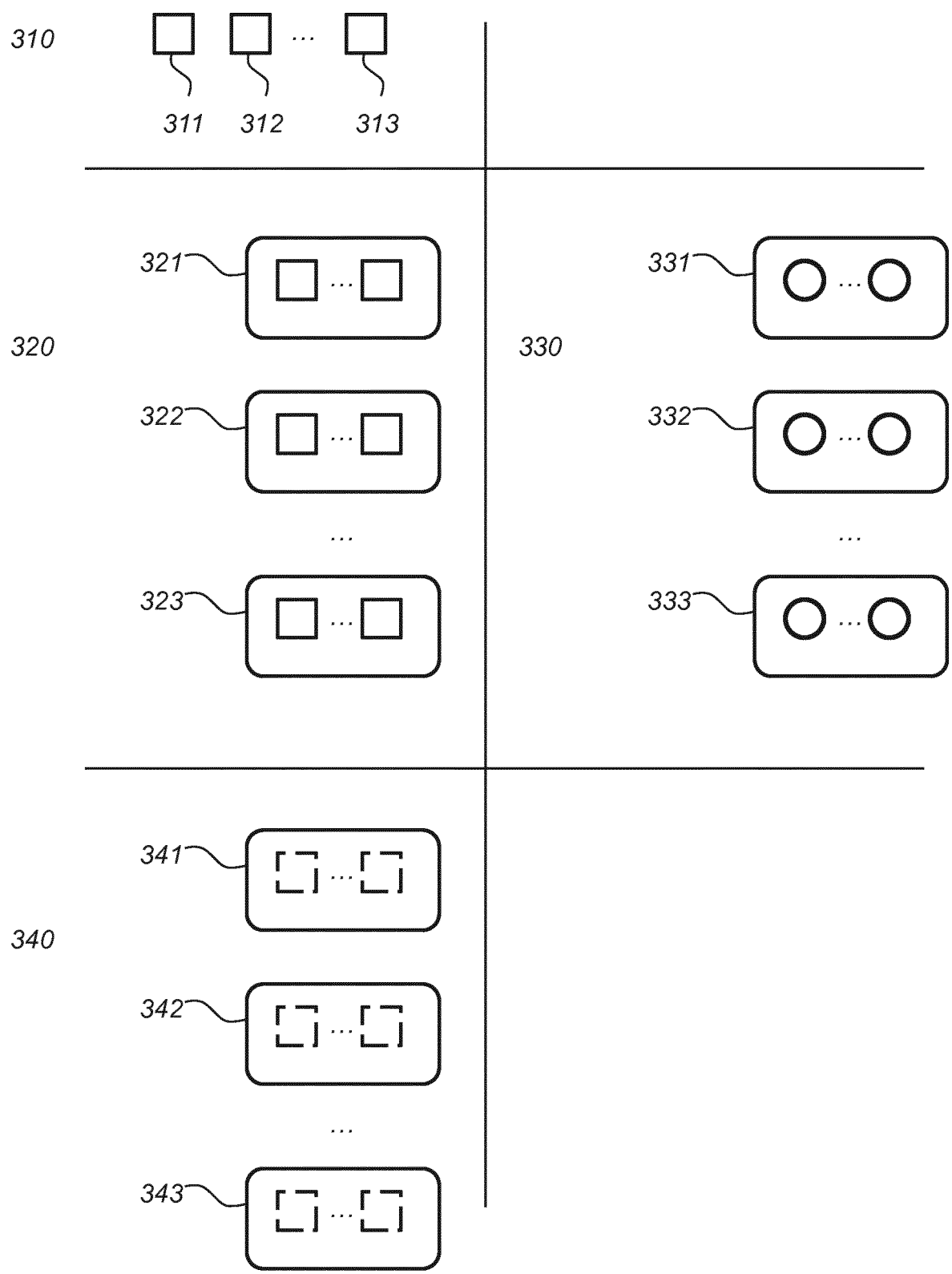
FIG. 3 schematically shows an example of an embodiment of a representation of an internal state.

The internal states are represented in internal state storage 130 in a special manner. FIG. 3 schematically shows an example of an embodiment of a representation of an internal state. FIG. 3 shows a large table with different views of the same internal state. Only the lower left box, at 340 shows the actual data as it is physically stored in internal state storage 130, e.g., in a memory. The individual data elements in box 340, e.g. bytes, are dashed to indicate that they are encoded.

For example, they may be encoded with some secret, e.g., random encoding chosen at compile time. The right column is the Fourier transform of the left column.

Shown in box 310 is a plain internal state. Shown are data elements, e.g., bytes, 311, 312 and 313 of the internal state. For example, in case of AES the number of bytes may be 16 or more. For example, the internal state 310 may be the 'state array' as defined in Fips 197.

Each data element shown in box 310 may be represented in the memory as a corresponding set of shares. For example, data element 311 corresponds to share set 321, data element 312 corresponds to share set 322 and data element 313 corresponds to share set 323. The relationship between a data element and a share set is one to many. The data size of a share set is a multiple of the size of a data element. For example, a share set may comprise multiple shares, each of which have the same size as the data elements, e.g., they may both be bytes.

The share sets shown in box 320 are not encoded. Thus, if these shares set where used like this in a white-box implementation, an attacker could simply read the share from memory and map it to the correct data element.

In box 330, discrete Fourier transforms of the share sets in 320 are shown. Shown are sets of Fourier coefficients 331, 332 and 333. For example, set of Fourier coefficients 331 may be obtained by applying a discrete Fourier transform in a finite field to share set 321. The sets of Fourier coefficients in box 330 are not encoded either, and cannot be stored in a memory in this way either in a white-box implementation. Box 340 shows the internal state represented as sets of encoded shares. The data in box 340 may be obtained from box 320 by encoding each share in each set separately. For example, by encoding the first share in set 321 one may obtain the first share in set 341, etc. In an embodiment, only the data shown in box 340 may be directly visible, e.g., may be physically stored in the memory.

Interestingly, encoding is done in the shares domain, whereas the meaning of a share set is expressed in the Fourier domain. Shares are separately encoded which normally obstructs performing most operations on them. However, the Fourier coefficients are a global property determined by the entire share set; through the relationship between the Fourier transform and convolution the meaning of the share sets can be manipulated even though they are separately encoded.

A set of shares in box 320 or 340 represents a data element of the internal state. Which data element is represented, depends on the Fourier coefficients. In an embodiment, one of the Fourier coefficients for each of the set of Fourier coefficients in box 330 is chosen as the data element it represents. For example, one may choose a predetermined one of the Fourier coefficients corresponding to the set of shares which gives the value of the data element, e.g., the Fourier coefficient may be equal to the data element. In an embodiment, it is the zeroth Fourier coefficients (e.g. the Fourier coefficient with index 0) which determines the value of the corresponding data element. This choice simplifies analysis and implementation as it has the consequence that the sum of the corresponding set of shares also determines the data elements (e.g. equals it). However, this is not needed, in an embodiment some other Fourier coefficient may determine the data element, e.g. the coefficients of index 1. It is not even needed that the same coefficient represents the data element for the different sets, e.g., in set 331 it may be the Fourier coefficient of index 0, while in set 332 it is the Fourier coefficient of index 1, etc. In fact, which Fourier coefficient represents the data value may even vary per round, e.g., per update of the internal state. For example, after the next update, in set 331 it may be the Fourier coefficient of index 2, while in set 332 it is the Fourier coefficient of index 3, etc.

Even more generally, it is not needed that a single Fourier coefficient determines the data element. For example, in an embodiment a subset of the Fourier coefficients determines the data element, e.g., a subset with 2 or more elements. The subset is a proper subset, e.g., at most half of the Fourier coefficients determine the data values. The remaining Fourier coefficients are used to protect against attacks, such as the share reduction attack.

The sets of Fourier coefficients corresponding to the sets of shares in the memory satisfy a predetermined relationship among them. This predetermined relationship is preserved by the updating as an invariant. In an embodiment, the predetermined relationship comprises that some of the Fourier coefficients are equal. The basic idea is to partly use the freedom available in the selection of shares that represent a variable for enforcing relations between the sets of shares representing different variables. The relationship is expressed in terms of the Fourier transform in the finite field $F_{256}$.

For example, in an embodiment the relationship comprises that two or more Fourier coefficients of different sets of Fourier coefficients are equal. For example, particular Fourier coefficients may be selected, e.g., at compile time. For example, in an embodiment the sets of Fourier coefficients are ordered, coefficients in the set having an index. The predetermined relationship comprises that for at least some index, at least two of the Fourier coefficients of the same index are equal. For example, the predetermined relationship may require that the zeroth Fourier coefficients of sets 331 and 332 are equal. The predetermined relationship may also comprise that for at least some index, all of the Fourier coefficients of that index are equal. For example, the predetermined relationship may require that the zeroth Fourier coefficients of sets 331, 332, 333 and all other sets of Fourier coefficients are equal.

The relationship is preferably extended to more, or more preferably all share sets. For example, in an embodiment, an index is chosen for each set of Fourier coefficients, the relationship comprising that the chosen Fourier coefficients of those sets are equal. For example, if there are 16 sets, one may select 16 indices, one for each set, and require that the corresponding Fourier coefficients are equal. For example, the coefficients with indices 1, 5, 7, . . . , in the first, second, third set of Fourier coefficients, . . . , respectively, may be equal.

The stricter the requirement on the predetermined relationship the harder it is for an attacker to find a collision. For example, the predetermined relationship may be that each Fourier coefficient in a set of Fourier coefficients, except one, is equal to a respective Fourier coefficient in the other sets of Fourier coefficients: the one exception being used to represent the data element. One way to do this is to require that Fourier coefficients of the same index are equal, except for one index, say the zeroth index. For example, the first Fourier coefficients in sets 331, 332, 333, . . . , may be equal, the second Fourier coefficients in sets 331, 332, 333, . . . , may be equal, etc.

The examples above do not impose relationships between Fourier coefficients in the same set. For example, for any internal state and any choice for one of the sets of shares, say any choice for set 321 or instead any choice for one of the sets of Fourier coefficients, say set 331, there is a way to choose the remaining set such that the internal state is validly represented and the relationship is satisfied. In other words, the number of valid representations of a single data element in the internal state is not reduced by requiring the relationship between the Fourier coefficients, but the number of valid representations of the entire internal state is.

There is thus a large choice in selecting the relationship. For example, assuming 16 data elements and n shares per set, using one Fourier coefficient per set as representing the data element and the rest for protection, one could have $n(n!)^{15}$, by selecting a Fourier coefficient in the first set to represent the data element (n choices), and ordering the other sets of Fourier coefficients to indicate which coefficient represents the data element and to which coefficients the rest are equal (n! choices). Selecting a random relationship from this large space further complicates the work of the attacker. For example, each device 100 could receive a different relationship, which could e.g. also serve to watermark the device.

The operators are chosen such that they preserve the relationship. For linear operators, this can be done since the Fourier transformation is linear and the relationships are linear. Maintaining the relationships for non-linear operators can be done using the insight that the mapping $$X \alpha \sum_{j=0}^{255} F_j * X^j,$$

effectively maps Fourier coefficient $\hat{x}_k$ onto $$\sum_{j=0}^{255} (\hat{f}_j)_k (\hat{x}_k)^j,$$

where $(\hat{f}_j)_k$ is the k-th Fourier coefficient of the share. In other words, the mapping on the set of shares translates to parallel polynomials on the Fourier coefficients. Thus, if two Fourier coefficients of the same index in different sets are equal, then this relationship is preserved simply by having the same mapping act on both sets of shares. For embodiments in which the same non-linear operator is applied to all data-elements in an internal state, and in which the relationship only implies equality relations for Fourier coefficients with the same index, preserving of the relationship is automatic, simply by applying the same mapping to all share sets. In this case, the share sets $F_j$ in $$X \alpha \sum_{j=0}^{255} F_j * X^j$$

can be chosen as any share sets which happen to represent the correct polynomial coefficients for the cryptographic primitive. For example, one may select a random share set $F_j$ to represent a coefficient, e.g., at compile time. In an embodiment, all but one of the elements in $F_j$ are selected as 0 though. For example, in an implementation of the inverse used in AES all entries in $F_j$ may be either 0 or 1.

Preserving other relationships can be done with an appropriate choice of the $F_j$. For example, suppose the first Fourier coefficient in sets 331 is equal to the second Fourier coefficient in set 332, according to the relationship. In this case, one may choose $(\hat{f}_j)_1$ of the non-linear operator acting on the set 331 equal to $(\hat{f}_j)_2$ of the non-linear operator acting on set 332 (for all j). If, say, the zeroth Fourier coefficient corresponds to the actual value of the data element, then one may choose $(\hat{f}_j)_0$ for these sets according to the desired non-linear operation, e.g., the desired S-box, which is to be performed on the data-elements.

It is also possible to have a data element represented by a subset of the Fourier coefficients, e.g., to determine the data element, e.g., a subset with 2 or more elements may be used. For example, the data element may be equal to the sum of the zeroth and first Fourier coefficient. This can be implemented by selecting to polynomials, expressed through their coefficients $(\hat{f}_j)_0$ and $(\hat{f}_j)_1$, the sum of which is equal to the desired operation on data element, e.g., the desired Sbox.

Note that any non-linear operation can be expressed as a polynomial. Even if the non-linear operators are defined using their Fourier coefficients, they are evaluated on (encoded) shares of a set of shares. For example, a power of a shares set may be computed as repeated convolutions of the share set with itself.

Updating an internal state in internal state storage 130 may involve non-linear and linear operators. FIG. 1 shows non-linear operations 141, 142, 143. The non-linear operations operating on an internal state may be arranged as separate non-linear operations, e.g., non-linear sub-operations, which act on a single one of the data elements of the internal state. For example, these sub-operations may be the same for all data elements, e.g., the same S-box, or they may be different. Even if the S-box which is performed on the level of the data-elements, say on the level of box 310, are the same, the operations which are performed on the level of the sets of shares, e.g., on box 320, or in the actual encoding on box 340 may be different, e.g., they may perform a different function for Fourier coefficients that are not part of the relationship, e.g., which are used to represent the data value. A non-linear operator acting on a single data-element acts only on the shares in the corresponding set of shares.

FIG. 1 shows linear operations 146, 147, 148. A linear operation updating the internal state act simultaneously on at least two sets of shares in the memory representing at least two data elements of the internal state. For example, a linear operation may be represented as a matrix, e.g., over the field with 2 elements (bits) or the larger finite field, e.g., $F_{256}$. Since both the relationships and the Fourier transform is a linear operation, the linear operation may be constructed by concatenating a Fourier operator producing a set of Fourier coefficients for each set of shares on which the linear operation acts,
    one or more linear operators acting on the Fourier coefficients preserving the invariant, and
    an inverse Fourier operator.

The input to the linear operation may be, e.g., a vector with as elements the shares of two or more sets of shares. For example, in so-far a linear operator acts on Fourier coefficients that represent the data value, they can perform the linear operation needed for the cryptographic primitive, e.g., as desired by a standard; but in so-far the linear one or more linear operators act on Fourier coefficient that do not represent the data value they can perform any linear operation, e.g., a random linear operation, so long the relationship is preserved. Note that if, say due to a fault attack the relationship was not satisfied in the first place, it is preferred that the relationship stays invalid, or at least that the chance of accidently restoring the relationship is not better than with a uniform random distribution.

For example, in an embodiment in which the relationship requires that Fourier coefficients with the same index are equal, except for the one (or more) Fourier coefficient that represents the data value, one may use the following:
- a Fourier operator producing a set of Fourier coefficients for each set of shares on which the linear operation acts, the sets of Fourier coefficients being ordered with coefficients in the set having an index.
- one or more linear operators acting on Fourier coefficients of the same index independent of Fourier coefficients of a different index, the one or more linear operators being arranged to act on Fourier coefficients preserving the invariant,
- an inverse Fourier operator.

Such a separation of operators is possible, but not necessary. For example, the one or more linear operators could comprise one operator to act on the Fourier coefficients that represent the data element, e.g., acting on one or more Fourier coefficients per set, and one linear operator that acts on all the remaining Fourier coefficients, e.g., a random linear operation except for the requirement that it preserves the relationship.

Note that the low-level multiplications when evaluating the matrix product may be done by table-lookup if the shares are encoded. Alternatively, the decoding and re-encoding of shares may be integrated in the linear operation if the encodings are linear.

As noted, some of the operations may be keyed. For example, in an operation a round key may be added to all or part of the internal state. The key may be stored in device 100 in an encoded form. Preferably, the keys use the same type encoding as the internal state does, e.g., as set of (encoded) shares with restrictions imposed on the Fourier coefficients of the sets. For example, the key may be represented in a memory of device 100 as a corresponding set of shares, the set of shares satisfying the predetermined relationship between the Fourier coefficients corresponding to the set of shares of the key according to the discrete Fourier transform in the finite field.

Returning to FIG. 1, the figure further shows an input interface 100 arranged to receive the input data. For example, the input interface 100 may comprise a computer network connection, a computer storage unit, etc. Input interface 100 may comprise an application programming interface (API); further examples are given herein. In an embodiment, the input data may already be encoded in a manner suitable for the internal state. Below we will describe a situation in which the input interface is not encoded according to a private encoding. In that case device 100 may comprise an optional an input operator 112 to the plain input data. Input operator 112 produces multiple sets of shares representing the initial internal state. The multiple sets of shares satisfying the predetermined relationship.

For example, the input operator may be constructed by concatenating a number of linear operators:
- an operator to map the input data to sets of Fourier coefficients that satisfy the relationship. For example, the operator may map the input data to the Fourier coefficients that represent the data elements. For example, if a single Fourier coefficient represents the data element, the operator could map data elements of the input directly to the corresponding Fourier coefficient. If multiple Fourier coefficients together represent an input data element (e.g. as the sum), all but one of the Fourier coefficient may be selected at random, and the last one may be computed from the input data element and the selected random Fourier coefficients. For the remaining protective Fourier coefficients, random choices are made satisfying the relationship. A random Fourier coefficient may be selected by applying a random operator to the input data. In white-box implementations it is often inadvisable to use a separate random number generator. For a grey-box implementation only, the random Fourier coefficients could be selected by a random number generator.
- an inverse Fourier transform
- an encoding operation, e.g., to encode each of the shares. The encodings may be chosen linear.

It has an advantage if the bit size of a share set is at least as large as the size of the input data. In this case, it is unlikely that a collision will occur, that is that two different input data will cause a collision on a share set. A better guarantee is obtained by making the input operator invertible for each share set. That is, the input operator may be chosen such that the input data can be uniquely determined from the content of a single set of shares representing a single data element. For the case of AES, this can be achieved by taking 17 shares. In such an implementation of AES with 17 shares, all collisions are avoided, so it is expected to be fully secure against Mutual Information Analysis (MIA).

Device 100 further comprises an output operator 122 to derive the output data from a final internal state. Output operator 122 maps a set of shares to the data element it represents plus a distortion. The distortion depends on the Fourier coefficients of the set of shares such that the distortion is zero if the Fourier coefficients satisfy the predetermined relationship. The output data may be plain output data, or output data encoded in an encoded as expected by a next application that may make use of the output data. We will assume that the output data is plain output data.

For example, the output operator may be constructed by concatenating
- a decoding operator to remove an encoding of the internal state
- a Fourier transform to transform the internal state to sets of Fourier coefficients
- an operator that maps those Fourier coefficients that represent a data element, to the data element they represent.
- an operator that maps the protective Fourier coefficients to a distortion, e.g., a distortion vector. The operator is constructed such that it maps Fourier coefficients that satisfy the relationship to 0, e.g., to no distortion. For example, vector(s) representing the relationship may be in the kernel of the operator.

Optionally, an encoding operator could be added in case a subsequent application expects the data to be delivered in an encoding.

Below a detailed embodiment is given of a cryptographic primitive implemented in a cryptographic device or method according to the invention. The chosen cryptographic primitive is the AES block cipher, chosen as an illustration. The description below is for the encryption operation, however the decryption operation follows straightforward. Note that for many elements variant implementations are possible. It is possible to build an AES implementation with n shares, where n is a divisor of 255, with the property that before and after all AddRoundKey, Shift Row, MixColumns and Sub-Bytes operations (or their inverses for AES decryption), for each k, $1 \leq k < n$, the k-th Fourier coefficients $(\hat{s}_k)_{r,c}$ of the share sets $S_{r,c}$ representing state byte $s_{r,c} = (\hat{s}_0)_{r,c}$ are equal for all row and column indices r,c. The row and column indices refer to a representation of the internal state of AES as a state array, e.g., with 4 rows and 4 columns. For the additive transformations AddRoundKey, ShiftRows and MixColumns this can be achieved by a suitable choice of the transformation on the Fourier coefficients, as will be detailed herein, while for the SubBytes operation this property can be guaranteed since the Fourier transform is compatible with polynomials acting on share sets. In this embodiment, one particular choice for the relationship is made. Moreover, the zeroth Fourier coefficient is used to represent a data element of internal state.

Suppose that, in such an implementation, an attacker changes a few shares in a share set, say $S_{0,0}$, in such a way that $(\hat{s}_0)_{0,0}$ is unchanged. Then at least one of the other Fourier coefficients $(\hat{s}_k)_{0,0}, K(\hat{s}_{n-1})_{0,0}$ must have changed (since otherwise he would not have changed anything). If before the change, for $1 \leq k < n$, the k-th Fourier coefficients $(\hat{s}_k)_{r,c}$ of the 16 share sets $S_{r,c}$ that represent the 16 state bytes $s_{r,c}$, are all equal to each other, then after the change there is at least one value of k, $1 \leq k < n$ such that the k-th Fourier coefficient of the changed share set $S_{0,0}$ is different from the k-th Fourier coefficient of the 15 other share sets.

When generating the AES output, which consists of 16 bytes, from the 16 share sets after the last AES operation, care must be taken to ensure that each output byte $out_i$ depends on $(\hat{s}_0)_{i \bmod 4, \lfloor i/4 \rfloor}$ and all $(\hat{s}_k)_{r,c}$, $1 \leq k < n$, $0 \leq r < 4$, $0 \leq c < 4$, in such a way that the output is wrong (i.e. $out_i \neq (\hat{s}_0)_{i \bmod 4, \lfloor i/4 \rfloor}$ for at least one value of i) when at least one $(\hat{s}_k)_{r,c}$ is different from the other $(\hat{s}_k)_{r',c'}$.

We note that this mechanism also makes a normal DFA attack more difficult: now the attacker's goal is to change some share set X in such a way that he can obtain information about the key from the way the output changes. But when this mechanism is in place, the only changes that the attacker can make that give outputs that the attacker may consider useful, are those where he only changes the zeroth Fourier coefficient of a share set, and leaves the other Fourier coefficients invariant. If only a single Fourier component is to be changed, then all shares of X must be changed in an appropriate way, which implies that the attacker needs to perform an n-th order DFA in order to be successful.

Here we present AES implementations that use the ingredients given before. The AES implementation transform an 128-bit input into an 128-bit output at run time. The implementations are created at compile time. The security of the implementations depends mainly on the number of shares, n. We first give the details for constructing an AES encryption.

At compile time, the implementer does the following:
1. Choose the number of shares, n, where n is a divisor of 255. Choosing n=1 does not offer a security advantage over a default AES implementation, and $n \in \{51,85,255\}$ may be too large to be practical, so preferably $n \in \{3,5,15,17\}$. The implementer also chooses an element $\Omega \in F_{256}$ with $\text{ord}(\Omega)=n$. As noted, the choice n=17 is especially beneficial.
2. The implementer expands the AES key into the $(N_r+1)$ round keys, as specified in the AES standard. Each round key consists of 16 bytes, arranged in a 4×4 array. The round key bytes are denoted
$\tilde{\kappa}_{i,j;0}^{(r)}$ with $0 \leq r \leq N_r$, $0 \leq i < 4$, $0 \leq j < 4$.

For each round index r, $0 \leq r \leq N_r$, the implementer randomly chooses n−1 bytes, denoted $\hat{\kappa}_k^{(r)}$ with $1 \leq k < n$. For each round r and position i, j, the implementer creates the n-component round key shares $K_{i,j}^{(r)}$ that have $\hat{\kappa}_{i,j;0}^{(r)}$ and $\hat{\kappa}_1^{(r)}, K, \hat{\kappa}_{n-1}^{(r)}$ as Fourier coefficients, so that $\hat{K}_{i,j}^{(r)} = (\kappa_{i,j;0}^{(r)}, K, \kappa_{i,j;n-1}^{(r)})$ with $$\kappa_{i,j;m}^{(r)} = \hat{\kappa}_{i,j;0}^{(r)} + \sum_{k=1}^{n-1} \Omega^{-km} \hat{\kappa}_k^{(r)} \quad 0 \leq m < n.$$

3. For each round r, position i, j and each share index m, the implementer randomly chooses an invertible additive encoding $E_{i,j;m}^{(r)} \in E$. The size of the AES implementation grows linearly with the number of round encodings that are used. To reduce the size of the implementation, the implementer can choose to use the same encodings in each round, so that the encodings do not depend on r; he may also choose to alternate the encodings per round, so that the encodings depend on r only through r mod 2. These choices have no effect on the security against the collusion and DFA attacks we consider—choosing a larger number of different encodings makes some white-box attacks harder. In each round r, the 16n encodings $E_{i,j;m}^{(r)}$ are preferably all distinct. The inverse of $E_{i,j;m}^{(r)}$ will be denoted $D_{i,j;m}^{(r)}$.
4. The implementer calculates the encoded round key shares $\tilde{\kappa}_{i,j;m}^{(r)} = E_{i,j;m}^{(r)}(\kappa_{i,j;m}^{(r)})$ and creates the encoded key share sets $\tilde{K}_{i,j}^{(r)} = (\tilde{\kappa}_{i,j;0}^{(r)}, K, \tilde{\kappa}_{i,j;n-1}^{(r)})$.
5. The implementer calculates encoded multiplication tables containing the bytes $\tilde{\mu}_{i,j;m_0,m_1;e_0,e_1}^{(r)} = E_{i,j;(m_0+m_1) \bmod n}^{(r)}(D_{i,j;m_0}^{(r)}(2^{e_0}) \cdot D_{i,j;m_1}^{(r)}(2^{e_1}))$.

Here $0 \leq r < N_r$, $0 \leq m_0, m_1 < n$, $0 \leq e_0, e_1 < 8$. Since the multiplication tables satisfy the symmetry property $\tilde{\mu}_{i,j;m_0,m_1;e_0,e_1} = \tilde{\mu}_{i,j;m_1,m_0;e_1,e_0}$, the implementer may, for instance, choose to store only the elements of the multiplication tables with $e_0 \leq e_1$.

For example, one may implement the powers of two used above as 2^0=00000001, 2^1=00000010, 2^2=00000100, 2^3=00001000, 2^4=00010000, 2^5=00100000, 2^6=01000000, 2^7=10000000; these numbers or bit strings form a basis of the field.
6. For each $0 \leq r < N_r$, the implementer chooses a random share representation $S(0)^{(r)}$ of $S(0)$, the output of the Sbox when the input equals 0, and random share representations $M_k^{(r)}$ of the polynomial coefficient $m_k$, for $0 \leq k < 8$, of the additive operator M in the Sbox. The implementer encodes the shares of these representations, which gives position-dependent encoded share sets $\tilde{S}(0)_{i,j}^{(r)} = (E_{i,j;0}^{(r)}(s(0)_0^{(r)}), K, E_{i,j;n-1}^{(r)})$ and $\tilde{M}_{k,i,j}^{(r)} = (E_{i,j;0}^{(r)}(m_{k;0}^{(r)}), K, E_{i,j;n-1}^{(r)}(m_{k;n-1}^{(r)}))$.
7. For any round index $0 \leq r < N_r$, the implementer creates an additive operator $\tilde{L}^{(r)}$ on 16n bytes as $\tilde{L}^{(r)} = E^{(r+1)}F^{-1}T^{-1}L^{(r)}TFD^{(r)}$, where For any round index r, $0 \leq r \leq N_r$, $D^{(r)}$ is defined as the operator that takes as input a vector $(B_0, K, B_{16n-1})$ of 16n bytes, and, for $0 \leq i,j < 4$ and $0 \leq m < n$, applies $D_{i,j;m}^{(r)}$ to $B_{n(i+4j)+m}$;

For any round index r, $0 \leq r \leq N_r$, $E^{(r)}$ takes as input a vector $(B_0, K, B_{16n-1})$ of 16n bytes, and, for $0 \leq i,j < 4$ and $0 \leq m < n$, applies $E_{i,j;m}^{(r)}$ to $B_{n(i+4j)+m}$;

F takes as input a sequence of 16n bytes $(B_0, K, B_{16n})$ and, for each i,j, sets $X = (B_{n(i+4j)}, K, B_{n(i+4j)+n-1})$, applies the Fourier transform to X and sets $(B_{n(i+4j)}, K, B_{n(i+4j)+n-1}) \leftarrow (\hat{x}_0, K, \hat{X}_{15})$.

T takes as input a vector of 16n bytes $(\tilde{B}_0, K, \tilde{B}_{16n-1})$, and permutes them into the sequence $(\tilde{B}'_0, K, \tilde{B}'_{16n-1})$, where $\tilde{B}'_{16m+i} = \tilde{B}_{in+m}$, for $0 \leq i < 16$, $0 \leq m < n$;

$L^{(r)}$ takes as input a vector of 16n bytes $(\tilde{B}'_0, K, \tilde{B}'_{16n-1})$, and, for each k with $0 \leq k < n$, applies transformation $L_k^{(r)}$ to the 16-byte vector $(\tilde{B}'_{16k}, K, \tilde{B}'_{16k+15})$.

The transformation $L_0^{(r)}$ puts its input $(\tilde{B}'_0, K, \tilde{B}'_{15})$ into a 4×4 matrix A with $A_{i,j} = \tilde{B}_{i+4j}$, $0 \leq i,j < 4$. If $0 \leq r < N_r - 1$, it applies the MixColumnsoShiftRows operation to A; if $r = N_r - 1$, it applies the ShiftRows operation to A. It then outputs the 16 bytes of A column-wise.

For $1 \leq k < n$, the transformation $L_k^{(r)}$ is a randomly chosen additive invertible transformation on 16 bytes with the property that, when acting on a 16-byte vector whose entries are all equal, it outputs a 16-byte vector whose entries are all equal. It is shown in below how such transformations can be generated efficiently.

8. The implementer constructs an additive operator $\tilde{U}_{in}$, operating on 16 bytes and outputting 16n bytes, as $\tilde{U}_{in} = E^{(0)} F^{-1} T^{-1} U_{in}$, where $$U_{in}(B_0, K, B_{15}) = (B_0, K, B_{15},$$

$$\underbrace{R_{in,1}(B_0, K, B_{15}), K, R_{in,1}(B_0, K, B_{15})}_{16 \text{ times}}, K$$

$$K, \underbrace{R_{in,n-1}(B_0, K, B_{15}), K, R_{in,n-1}(B_0, K, B_{15})}_{16 \text{ times}}),$$

and each $R_{in,k}$, $1 \leq k < n$, is a random additive operator acting on 16 bytes and outputting one byte; it is repeated 16 times in $U_{in}$. A good method for constructing the operators $R_{in,k}$ is to choose a random invertible operator R on 16 bytes, and let $R_{in,k}(B_0,K,B_{15})=B'_{k-1}$ where $(B'_0,K,B'_{15})=R(B_0,K,B_{15})$. When n=17, this construction guarantees that there is a bijection between the 16 input bytes $(B_0,K,B_{15})$ and 16 bytes $(R_1(B_0,K,B_{15}),K,R_{16}(B_0,K,B_{15}))$. It follows that there is a bijection between the 16 input bytes and the 16 Fourier coefficients $\hat{s}_1,K,\hat{s}_{16}$ with non-zero indices of the share set representing any state byte, so that different inputs always give different share sets: there are no collisions.

9. The implementer constructs an operator $\tilde{U}_{out}$ as $\tilde{U}_{out} = U_{out} TFD^{(N_r)}$ where $$U_{out}(B_0, K, B_{16n-1}) = (B_0, K, B_{15}) + \sum_{k=1}^{n-1} R_{out,k}(B_{16k}, K, B_{16k+15}),$$

where each $R_{out,k}$, $1 \leq k < n$, is a random additive operator acting on 16 bytes and outputting 16 bytes, with the property that when acting on a 16-byte vector of which all entries are the same, the all-zero vector is output.

The implementer builds an AES encryption program that uses the operators $\tilde{U}_{in}$, $\tilde{L}^{(r)}$ and $\tilde{U}_{out}$, the encoded key shares $\tilde{K}_{i,j}^{(r)}$, the encoded multiplication tables $\tilde{\mu}_{i,j;m_0,m_1;e_0,e_1}$, the Sbox offset shares $\tilde{S}(0)_{i,j}^{(r)}$ and linear transformation constant shares $\tilde{M}(0)_{k,i,j}^{(r)}$. Using the multiplication tables, the implementor creates the functions Mul, Conv and Square.

The function Mul multiplies two individually encoded shares x and y, with respective indices $m_x$ and $m_y$, encoded according to the encodings of shares $m_x$ and $m_y$ in round r and position i,j, and returns the encoded result encoded according to the encoding of share $(m_x+m_y)$ mod n in round r and position i,j. Note that in a convolution with n shares, the product $x_{m_x} y_{m_y}$ shows up in the share $z_{m_x+m_y \bmod n}$ of z=xy. The position i,j is the position in the 4×4 array of the AES state. A pseudocode implementation is Mul(r,i,j,$m_x$,$m_y$,x,y):
find bits $\xi_0, K, \xi_7$ such that $$x = \sum_{k=0}^{7} \xi_k 2^k$$

find bits $\eta_0, K, \eta_7$ such that $$\eta = \sum_{k=0}^{7} \eta_k 2^k$$

return $$\sum_{e_x=0}^{7} \xi_{e_x} \sum_{e_y=0}^{7} \eta_{e_y} \tilde{\mu}_{i,j,m_x,m_y;e_x,e_y}^{(r)}$$

where the summations are over $F_{256}$.

The function Conv returns the encoded convolution of two encoded share sets, $X=(x_0,K,x_{n-1})$ and $Y=(y_0,K,y_{n-1})$, according to the encodings in round r at position i,j. A pseudocode implementation is
Conv(r,i,j,X,Y):
 Z←(0,K,0)
 for 0≤$m_x$<n
 for 0≤$m_y$<n
  $z_{(m_x+m_y) \bmod n}$←$z_{(m_x+m_y) \bmod n}$+Mul(r,i,j,$m_x$,$m_y$,$x_{m_x}$,$y_{m_y}$)
 return Z
where the summation is over $F_{256}$.

The function Square returns the encoded convolution of encoded share set $X=(x_0,K,x_{n-1})$ with itself, according to the encodings in round r and position i,j. A pseudocode implementation is
Square (r,i,j,X):
 Z←(0,K,0)
 For 0≤$m_x$<n
  $z_{(2m_x) \bmod n}$←$z_{(2m_x) \bmod n}$+Mul(r,i,j,$m_x$,$m_x$,$x_{m_x}$,$x_{m_x}$)
 return Z
where the summation is over $F_{256}$.

Using these functions as subroutines, the implementer creates the function Inverse, which returns the 254-fold encoded convolution of encoded share set X with itself, according to the encodings in round r and position i,j. A pseudocode implementation is
Inverse (r,i,j;X):
 Y←Square(r,i,j,X)
 Z←Conv(r,i,j,X,Y)
 Y←Square(r,i,j,Y)
 X←Conv(r,i,j,Y,Z)
 Y←Square(r,i,j,Y)
 Z←Conv(r,i,j,X,Y)
 Z←Square(r,i,j,Z)
 Z←Square(r,i,j,Z)
 Z←Square(r,i,j,Z)
 Y←Conv(r,i,j,X,Z)
 Y←Square(r,i,j,Y)
 return Y The function ShareSBox returns an encoded share representation of the output of the Sbox operator, acting on an encoded share set X by means of convolutions that are encoded according to the encodings in round r and position i,j. A pseudocode implementation is
ShareSbox (r,i,j,X):
 Y←Inverse(r,i,j,X)
 Z←Conv(r,i,j,$\tilde{M}_{0;i,j}^{(r)}$,Y)
 for 1≤k<8
  Y←Square(r,i,j,Y)
  Z←Z+Conv(r,i,j,$\tilde{M}_{k;i,j}^{(r)}$,Y)
 Z←Z+$\tilde{S}(0)_{i,j}^{(r)}$
 return Z The function SubShares applies the function ShareSbox to each share set, as per the following pseudocode.

SubShares $(r,B_0,K,B_{16n-1})$:
for $0 \leq i < 4$
for $0 \leq j < 4$
$(B_{n(i+4j)},K,B_{n(i+4j)+n-1}) \leftarrow \text{ShareSbox}(r,i,j,(B_{n(i+4j)},K,B_{n(i+4j)+n-1}))$
return $B_0,K,B_{16n-1}$ The AES encryption function AES encrypts the plain 16-byte input $(in_0,K,in_{15})$ and returns the plain 16-byte result $(out_0,K,out_{15})$. An implementation in pseudocode is AES $(in_0,K,in_{15})$:

$(B_0,K,B_{16n-1}) \leftarrow \tilde{U}_{in}(in_0,K,in_{15})$
for $0 \leq r < N_r$
for $0 \leq i < 4$
for $0 \leq j < 4$
$(B_{n(i+4j)},K,B_{n(i+4j)+n-1}) \leftarrow (B_{n(i+4j)},K,B_{n(i+4j)+n-1}) + \tilde{K}_{i,j}^{(r)}$
$(B_{n(i+4j)},K,B_{n(i+4j)+n-1}) \leftarrow \text{ShareSbox}(B_{n(i+4j)},K,B_{n(i+4j)+n-1})$
$(B_0,K,B_{16n-1}) \leftarrow \tilde{L}^r)(B_0,K,B_{16n-1})$
for $0 \leq i < 4$
for $0 \leq j < 4$
$(B_{n(i+4j)},K,B_{n(i+4j)+n-1}) \leftarrow (B_{n(i+4j)},K,B_{n(i+4j)+n-1}) + \tilde{K}_{i,j}^{(N_r)}$
$(out_0,K,out_{15}) \leftarrow \tilde{U}_{out}(B_0,K,B_{16n-1})$
return $(out_0,K,out_{15})$ An important feature of the AES program with 17 shares is that for any encoded share set representing a state byte, there exists a bijection between the 16 input bytes and the first to sixteenth Fourier coefficients of the decoded share set. This implies that for two different inputs there can never be a simultaneous collision on the 17 shares in any such share set, so that MIA/Collision attacks won't be successful. More generally, in an embodiment, the internal state of a previous round may be derived from a set of shares in the next round, using knowledge of the implementation (encodings, keys, etc.). For example, in an embodiment there is a bijection between the unencoded (without shares) internal state (or the input) in a round, and a share set of the encoded internal state in the next round.

The construction above uses random additive operators with certain prescribed properties. At compile time, the implementer must choose random additive operators with certain properties. Here we show how this could be done efficiently. Since a byte is a concatenation of 8 bits, there is a one-to-one mapping between additive operators on $N_{bytes}$ bytes and binary matrices of size $N \times N$, where $N = 8N_{bytes}$.

Generating a random invertible binary matrix of arbitrary size $N \times N$. The algorithm consists of the following steps:
1. Construct a binary matrix L of size $N \times N$ with ones on the diagonal, zeroes above the diagonal and random bits below the diagonal.
2. Construct a binary matrix U of size $N \times N$ with ones on the diagonal, zeroes below the diagonal and random bits above the diagonal.
3. Return A=LU.

Generating a random invertible binary matrix of size $8N_{bytes} \times 8N_{bytes}$ with the property that when acting on an $N_{bytes}$-times repeated sequence of 8 bits it results in an $N_{bytes}$-times repeated sequence of 8 bits. The algorithm consists of the following steps:
1. Construct random invertible binary matrix A of size $8 \times 8$.
2. Construct a random binary matrix B of size $8 \times 8(N_{bytes}-1)$.
3. Construct a random invertible binary matrix C of size $8(N_{bytes}-1) \times 8(N_{bytes}-1)$.
4. Let R be the block matrix $$R = \begin{pmatrix} A & B \\ 0 & C \end{pmatrix}.$$

5. Construct a random binary matrix L' of size $8(N_{bytes}-1) \times 8(N_{bytes}-1)$ with ones on the diagonal, zeroes above the diagonal and random bits below the diagonal.
6. Construct the block matrix D of size $8(N_{bytes}-1) \times 8$ by stacking L copies of the $8 \times 8$ identity matrix $I_{8 \times 8}$.
7. Construct the block matrix $$L = \begin{pmatrix} I_{8 \times 8} & 0 \\ D & L' \end{pmatrix}.$$

8. Return $A = LRL^{-1}$.

Generating a random invertible binary matrix of size $8N_{bytes} \times 8N_{bytes}$ with the property that when acting on an $N_{bytes}$-times repeated sequence of 8 bits it results in the all-zero bit sequence.
1. Let the matrix A be the zero matrix of size $8 \times 8$.
2. Execute Steps 2-8 of the algorithm in Section 4.2.

In the various embodiments of the cryptographic device, the input interface may be selected from various alternatives. For example, input interface may be a network interface to a local or wide area network, e.g., the Internet, a storage interface to an internal or external data storage, a keyboard, an application interface (API), etc. The output interface may be a network interface to a local or wide area network, e.g., the Internet, a storage interface to an internal or external data storage, an application interface (API), a display, a printer, etc. The input and output interfaces may be combined in a communication interface.

The cryptographic device may have a user interface, which may include well-known elements such as one or more buttons, a keyboard, display, touch screen, etc. The user interface may be arranged for accommodating user interaction for performing a cryptographic action, say a decryption.

Memory of device 100, e.g. internal state storage 130, may be implemented as an electronic memory, say a flash memory, or a RAM, or magnetic memory, say hard disk or the like. Storage 110 may comprise multiple discrete memories together making up the memory. The memory may be part volatile, part non-volatile. For example, tables, and computer instructions may be stored in the non-volatile part, and internal states in the volatile part.

Typically, the device 100 comprise a microprocessor (not separately shown in FIG. 1) which executes appropriate software stored at the device 100; for example, that software may have been downloaded and/or stored in a corresponding memory, e.g., a volatile memory such as RAM or a non-volatile memory such as Flash (not separately shown). Alternatively, device 100 may, in whole or in part, be implemented in programmable logic, e.g., as field-programmable gate array (FPGA). Device 100 may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog. VHDL etc.

In an embodiment, device 100 comprises one or more or all of: an input interface circuit, an input operator circuit, an output interface circuit, an output operator circuit, an internal state storage circuit, multiple non-linear operation circuits, multiple linear operation circuits. The device 100 may comprise additional circuits. The circuits implement the corresponding units described herein. The circuits may be a processor circuit and storage circuit, the processor circuit executing instructions represented electronically in the storage circuits. The circuits may also be, FPGA, ASIC or the like.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

Figure 4:
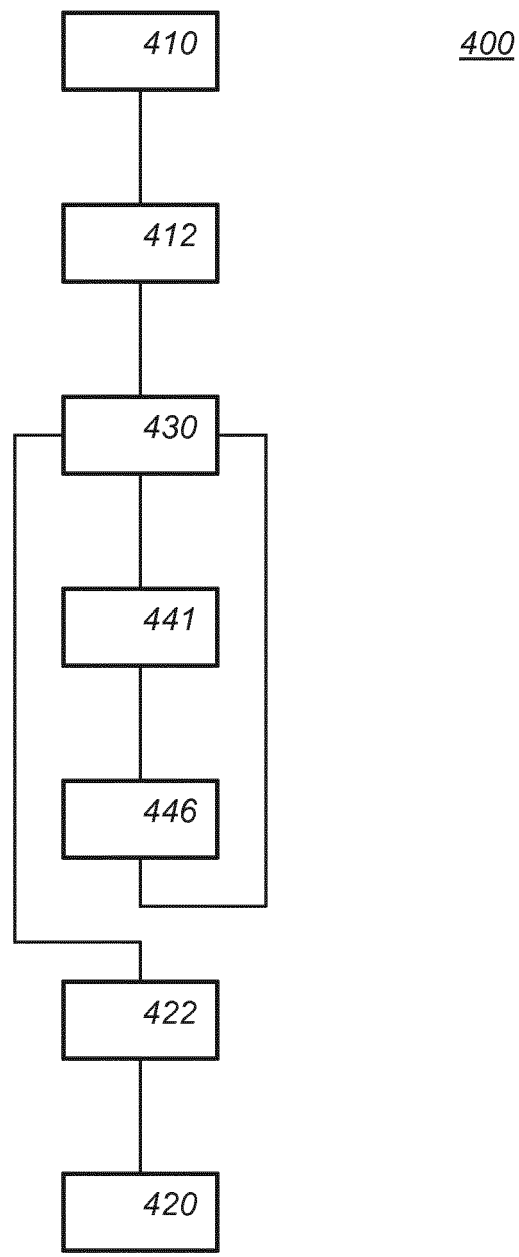
FIG. 4 schematically shows an example of an embodiment of a cryptographic method.

FIG. 4 schematically shows an example of an embodiment of a cryptographic method 400. Method 400 is arranged to perform a cryptographic operation on input data obtaining output data. Method 400 comprises receiving 410 the input data.
applying 412 an input operator to plain input data, said input operator producing multiple sets of shares representing the initial internal state, the multiple sets of shares satisfying the predetermined relationship,
storing 430 an internal state, the internal state comprising one or more data elements, each data element being represented in the memory as a corresponding set of shares, a set of shares in the memory having a corresponding set of Fourier coefficients according to a discrete Fourier transform in a Finite field, the sets of Fourier coefficients corresponding to the sets of shares in the memory satisfying a predetermined relationship among them,
repeatedly updating the internal state, updating the internal state being arranged so that an updated set of Fourier coefficients corresponding to the share sets of the updated internal state satisfies the predetermined relationship among them as an invariant, the updating comprises applying 441 one or more non-linear operators and/or one or more non-linear operators 446, after the operators are applied the updated internal state is stored again in 430
applying 422 an output operator to the final internal state to derive the output data, the output operator mapping a set of shares to the data element it represents plus a distortion, said distortion depending on the Fourier coefficients of the set of shares such that the distortion is zero if the Fourier coefficients satisfy the predetermined relationship. For example, the output operator may be applied after a predetermined number of updating rounds have been executed in the internal state, and
outputting 420 the output data.

As noted herein, some of the steps in the method are optional; for example encoding the input data is not needed if it is already encoded.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, updating steps may be executed, at least partially, in parallel; for example, applying non-linear operators to different data elements of the internal state may be done in parallel. Moreover, a given step may not have finished completely before a next step is started.

A method according to the invention may be executed using software, which comprises instructions for causing a processor system to perform method 400. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. A method according to the invention may be executed using a bitstream arranged to configure programmable logic, e.g., a field-programmable gate array (FPGA), to perform the method.

It will be appreciated that the invention also extends to computer programs, particularly computer programs on or in a carrier, adapted for putting the invention into practice. The program may be in the form of source code, object code, a code intermediate source, and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the means of at least one of the systems and/or products set forth.

Figure 5A:
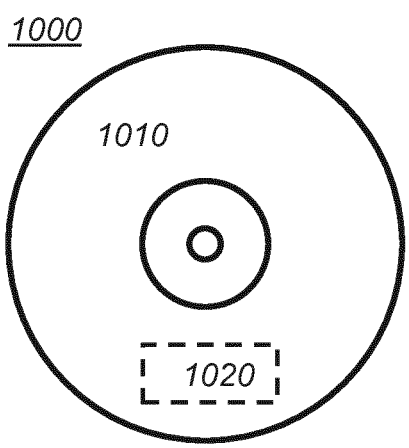
FIG. 5a schematically shows a computer readable medium having a writable part comprising a computer program according to an embodiment.

FIG. 5a shows a computer readable medium 1000 having a writable part 1010 comprising a computer program 1020, the computer program 1020 comprising instructions for causing a processor system to perform a cryptographic method, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said cryptographic method.

Figure 5B:
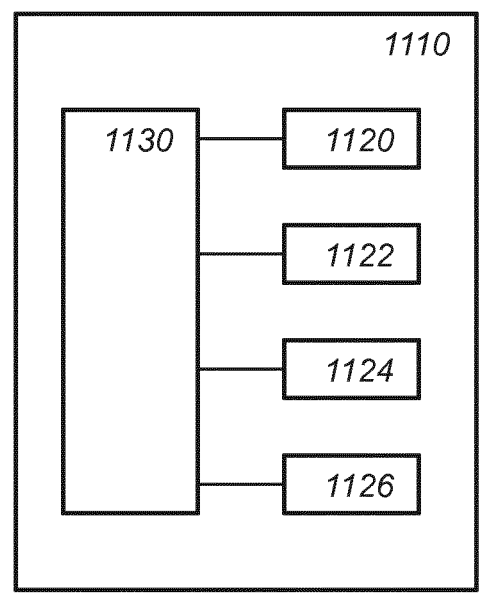
FIG. 5b schematically shows a representation of a processor system according to an embodiment.

FIG. 5b shows in a schematic representation of a processor system 1140 according to an embodiment of a cryptographic device. The processor system comprises one or more integrated circuits 1110. The architecture of the one or more integrated circuits 1110 is schematically shown in FIG. 5b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, the cryptographic device may comprise a processor circuit and a memory circuit, the processor being arranged to execute software stored in the memory circuit. For example, the processor circuit may be an Intel Core i7 processor, ARM Cortex-R8, etc. In an embodiment. The memory circuit may include a ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

The following clauses are not the claims, but include contemplated embodiments. The Applicant hereby gives notice that new claims may be formulated to such clauses and/or combinations of such clauses and/or features taken from the description or claims, during prosecution of the present application or of any further application derived therefrom.

1. An electronic cryptographic device arranged to perform a cryptographic operation on input data obtaining output data, the cryptographic device comprising
   an input interface arranged to receive the input data,
   a memory arranged to store an internal state, the internal state comprising one or more data elements, each data element being represented in the memory as a corresponding set of shares, a set of shares in the memory having a corresponding set of Fourier coefficients according to a discrete Fourier transform in a finite field, the sets of Fourier coefficients corresponding to the sets of shares in the memory satisfying a predetermined relationship among them,
   a processor circuit configured to
      perform the cryptographic operation by repeatedly updating the internal state, an initial internal state being derived from the input data, the output data being derived from a final internal state, updating the internal state being arranged so that an updated set of Fourier coefficients corresponding to the share sets of the updated internal state satisfies the predetermined relationship among them as an invariant,
      apply an output operator to the final internal state to derive the output data, the output operator mapping a set of shares to the data element it represents plus a distortion, said distortion depending on the Fourier coefficients of the set of shares such that the distortion is zero if the Fourier coefficients satisfy the predetermined relationship.

2. A cryptographic device as in Clause 1, wherein the predetermined relationship comprises that at least two Fourier coefficients of different sets of Fourier coefficients are equal.

3. An electronic cryptographic device as in Clause 1 or 2, wherein updating the internal state comprises applying non-linear operations to the data elements of the internal state, a non-linear operation being arranged to act on a data element of the internal state by acting on shares in the memory in the corresponding set of shares that represents the data element.

4. A cryptographic device as in Clause 3, wherein the non-linear operation is a polynomial in the finite field, the processor circuit being arranged to computed powers of a shares set as convolutions of the share set with itself.

5. A cryptographic device as in the combination of Clause 2 and Clause 4, wherein the polynomial defines parallel polynomials on the Fourier coefficients, all coefficients of the parallel polynomials acting on the at least two Fourier coefficients of different sets of Fourier coefficients being equal.

6. An electronic cryptographic device as in any one of the preceding clauses, wherein updating the internal state comprises applying linear operations to the internal state, the linear operating simultaneously on at least two sets of shares in the memory representing at least two data elements of the internal state.

7. A cryptographic device as in Clause 6, wherein the linear operation is constructed by concatenating
   a Fourier operator producing a set of Fourier coefficients for each set of shares on which the linear operation acts, the sets of Fourier coefficients being ordered with coefficients in the set having an index,
   one or more linear operators acting on Fourier coefficients of the same index independent of Fourier coefficients of a different index, the one or more linear operators being arranged to act on Fourier coefficients preserving the invariant,
   an inverse Fourier operator.

8. An electronic cryptographic method (400) to perform a cryptographic operation on input data obtaining output data, the cryptographic method comprising
   receiving (410) the input data,
   storing (430) an internal state, the internal state comprising one or more data elements, each data element being represented in the memory as a corresponding set of shares, a set of shares in the memory having a corresponding set of Fourier coefficients according to a discrete Fourier transform in a finite field, the sets of Fourier coefficients corresponding to the sets of shares in the memory satisfying a predetermined relationship among them,
   performing (441,446) the cryptographic operation by repeatedly updating the internal state, an initial internal state being derived from the input data, the output data being derived from a final internal state, updating the internal state being arranged so that an updated set of Fourier coefficients corresponding to the share sets of the updated internal state satisfies the predetermined relationship among them as an invariant,
   apply (422) an output operator to the final internal state to derive the output data, the output operator mapping a set of shares to the data element it represents plus a distortion, said distortion depending on the Fourier coefficients of the set of shares such that the distortion is zero if the Fourier coefficients satisfy the predetermined relationship.

9. A computer readable medium (1000) comprising transitory or non-transitory data (1020) representing instructions to cause a processor system to perform the method according to Clause 8.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. An cryptographic device comprising:
an input interface circuit, wherein the input interface circuit is arranged to receive an input data,
a memory circuit,
wherein the memory circuit is arranged to store an internal state,
wherein the internal state comprises one or more data elements,
wherein each data element is represented in the memory circuit as a set of shares,
wherein each set of shares in the memory circuit has a corresponding first set of first Fourier coefficients,
wherein the first Fourier coefficients are calculated according to a discrete Fourier transform in a finite field,
wherein a predetermined relationship between the first Fourier coefficients is satisfied,
a processor circuit,
wherein the processor circuit is arranged to perform a cryptographic operation by repeatedly updating the internal state,
wherein an initial internal state is derived from the input data,
wherein an output data is derived from a final internal state,
wherein the predetermined relationship is satisfied within an updated set of updated Fourier coefficients if the predetermined relationship is between each first set of the first Fourier coefficients is satisfied,
wherein each of the updated sets of updated Fourier coefficients corresponds to at least one of the share sets of the updated internal state,
wherein the processor circuit is arranged to apply an output operator to the final internal state so as to derive the output data,
wherein the output operator maps a set of shares to the data element it represents plus a distortion,
wherein the distortion is zero if the first Fourier coefficients satisfies the predetermined relationship and the said distortion depends on the first Fourier coefficients.

2. The cryptographic device as in claim 1,
wherein a set of shares represents a data element,
wherein the data element is determined by a subset of the first Fourier coefficients.

3. The A cryptographic device as in claim 1,
wherein a set of shares represents a data element,
wherein the data element is equal to one of the first Fourier coefficients.

4. The cryptographic device as in claim 1,
wherein the predetermined relationship comprises a requirement,
wherein the requirement is that at least two Fourier coefficients of different sets of Fourier coefficients are equal.

5. The cryptographic device as in claim 4,
wherein the first sets of first Fourier coefficient comprises a second set of second Fourier coefficients and third set of third Fourier coefficients,
wherein each of the second Fourier coefficients, except one, is equal to a respective third Fourier coefficient.

6. The cryptographic device as in claim 3,
wherein updating the internal state comprises applying non-linear operations to the data elements,
wherein a non-linear operation is arranged to act on a data element of the internal state by acting on shares in the memory circuit in the corresponding set of shares that represents the data element,
wherein the same non-linear operation acts on the sets of shares corresponding to the data elements.

7. The A cryptographic device as in claim 6,
wherein the non-linear operation is a polynomial in the finite field,
wherein the processor circuit is arranged to compute powers of a share set as convolutions of the share set with itself.

8. The cryptographic device as in claim 1,
wherein updating the internal state comprises applying linear operations to the internal state,
wherein the linear operation is applied simultaneously to at least two sets of shares in the memory circuit,
wherein the at least two sets of shares in the memory circuit represent at least two data elements of the internal state.

9. The cryptographic device as in claim 8,
wherein the linear operation is constructed by concatenating a Fourier operator, one or more linear operators and an inverse Fourier operator,
wherein the Fourier operation is arranged to produce at least one of the first set of first Fourier coefficients for each set of shares on which the linear operation acts,
wherein the one or more linear operators are arranged to act the Fourier coefficients so as to preserve the predetermined relationship.

10. The cryptographic device as in claim 9,
wherein the first sets of first Fourier coefficients are ordered,
wherein the first Fourier coefficients in the set have an index,
wherein the one or more linear operators act on the first Fourier coefficients of the same index independent of first Fourier coefficients of a different index.

11. The cryptographic device as in claim 1,
wherein each first set of first Fourier coefficients comprises one or more representing Fourier coefficients and one or more protective Fourier coefficients,
wherein the one or more representing Fourier coefficients represent the data element,
wherein the output operator is constructed by concatenating one or more protective operators,
wherein at least one of the one or more protective operators map the one or more protective Fourier coefficients to the distortion.

12. The cryptographic device as in claim 11,
wherein the output operator is constructed by concatenating a decoding operator, a Fourier transform a first operator and a protective operator,
wherein the decoding operator is arranged to remove an encoding of the final internal state,
wherein the Fourier transform is arranged to transform the final internal state to the first sets of first Fourier coefficients corresponding to the sets of shares mapped by the output operator,
wherein the first operator maps the first Fourier coefficients corresponding to the data element, to the corresponding data element.

13. The A cryptographic device as in claim 1,
wherein performing the cryptographic operation comprises adding a key to all or part of the internal state,
wherein the key is represented in the memory circuit as a corresponding set of shares,
wherein the set of shares satisfies the predetermined relationship between the first Fourier coefficients corresponding to the set of shares of the key.

14. The cryptographic device as in claim 1, wherein the combined bit size of at least one of the first sets of shares is at least as large as the bit-size of the input data.

15. The cryptographic device as in claim 1, wherein the cryptographic operation is a block cipher.

16. The cryptographic device as in claim 1, wherein the shares in at least one of the first set of shares represent a data element which is encoded with linear encodings.

17. The A cryptographic device as in claim 1,
wherein the processor circuit is arranged to apply an input operator to plain input data,
wherein the input operator is arranged to produce multiple sets of shares representing the initial internal state,
wherein the multiple sets of shares satisfy the predetermined relationship.

18. An electronic cryptographic method comprising
receiving an input data,
storing an internal state,
wherein the internal state comprises one or more data elements,
wherein each data element is represented in the memory as a corresponding set of shares,
wherein each set of shares in the memory circuit has a corresponding first set of first Fourier coefficients,
wherein the first Fourier coefficients are calculated according to a discrete Fourier transform in a finite field,
wherein a predetermined relationship between the first Fourier coefficients is satisfied,
performing a cryptographic operation by repeatedly updating the internal state,
wherein an initial internal state is derived from the input data,
wherein an output data is derived from a final internal state,
wherein the predetermined relationship is satisfied within an updated set of updated Fourier coefficients if the predetermined relationship is between each first set of the first Fourier coefficients is satisfied,
wherein each of the updated sets of updated Fourier coefficients corresponds to at least one of the share sets of the updated internal state,
applying an output operator to the final internal state to so as derive the output data,
wherein the output operator maps a set of shares to the data element it represents plus a distortion,
wherein the distortion is zero if the first Fourier coefficients satisfies the predetermined relationship and the said distortion depends on the first Fourier coefficients.

19. A computer program stored on a non-transitory medium, wherein the computer program when executed on a processor performs the method as claimed in claim 18.

20. The method as in claim 18,
wherein the predetermined relationship comprises a requirement,
wherein the requirement is that at least two Fourier coefficients of different sets of Fourier coefficients are equal.

* * * * *